(12) United States Patent
Hsiao et al.

(10) Patent No.: US 7,313,858 B2
(45) Date of Patent: Jan. 1, 2008

(54) METHOD FOR MANUFACTURING A MAGNETIC HEAD COIL STRUCTURE AND/OR POLE TIP STRUCTURE

(75) Inventors: Richard Hsiao, San Jose, CA (US);
Prakash Kasiraj, San Jose, CA (US);
Quang Le, San Jose, CA (US); Paul Phong Nguyen, San Jose, CA (US);
Son Van Nguyen, Los Gatos, CA (US);
Denny D. Tang, Saratoga, CA (US);
Patrick Rush Webb, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 434 days.

(21) Appl. No.: 10/815,429

(22) Filed: Mar. 31, 2004

(65) Prior Publication Data

US 2004/0177493 A1     Sep. 16, 2004

Related U.S. Application Data

(62) Division of application No. 10/115,414, filed on Apr. 2, 2002, now Pat. No. 6,901,653.

(51) Int. Cl.
*G11B 5/17* (2006.01)
*G11B 5/187* (2006.01)

(52) U.S. Cl. .............. 29/603.23; 29/603.13; 29/603.25; 29/852; 430/315; 430/324; 427/97.7; 427/131; 427/272

(58) Field of Classification Search .......... 29/603.23, 29/603.24, 603.25, 603.13, 603.07, 852; 29/846; 216/2, 22; 430/314, 315, 323, 324; 427/97.7, 98.4, 131, 272; 360/122, 123

See application file for complete search history.

(56) References Cited

U.S. PATENT DOCUMENTS

| | | | |
|---|---|---|---|
| 4,489,146 A | * | 12/1984 | Bock et al. ............... 430/323 |
| 6,195,872 B1 | * | 3/2001 | Sasaki ..................... 29/603.24 |
| 6,416,677 B1 | * | 7/2002 | Wei et al. ................ 216/22 |
| 2002/0030928 A1 | * | 3/2002 | Hsiao et al. ............. 360/123 |

FOREIGN PATENT DOCUMENTS

| JP | 11-135482 | * | 5/1999 |
|---|---|---|---|
| JP | 2000-11323 | * | 1/2000 |

OTHER PUBLICATIONS

Smith, W.F., "Principles of Materials Science and Engineering", 1986, McGraw-Hill, Inc., pp. 70-72.*
Office Action Summary from U.S. Appl. No. 10/717,112 which was mailed on Apr. 11, 2007.

\* cited by examiner

*Primary Examiner*—A. Dexter Tugbang
(74) *Attorney, Agent, or Firm*—Zilka-Kotab, PC

(57) ABSTRACT

A Damascene process is provided for manufacturing a coil structure for a magnetic head. During the manufacturing process, an insulating layer is initially deposited after which a photoresist layer is deposited. A silicon dielectric layer is then deposited on the photoresist layer. After masking the silicon dielectric layer, at least one channel is etched in the photoresist layer and the silicon dielectric layer. Then, a conductive seed layer is deposited in the at least one channel. The at least one channel is then ready to be filled with a conductive material and chemically/mechanically polished to define a coil structure.

18 Claims, 12 Drawing Sheets

METHOD FOR MANUFACTURING A MAGNETIC HEAD COIL STRUCTURE AND/OR POLE TIP STRUCTURE

RELATED APPLICATIONS

This application is a divisional of U.S. patent application Ser. No. 10/115,414, filed Apr. 02, 2002, now U.S. Pat. No. 6,901,653, issued Jun. 7, 2005.

FIELD OF THE INVENTION

The present invention relates to magnetic head coil structures, and more particularly, this invention relates to improving the fabrication of high aspect magnetic head coil structures.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads are then used to read data from the tracks on the disk surfaces.

FIGS. 1-2 illustrate a method of manufacturing a coil structure associated with a magnetic head, in accordance with the prior art. FIG. 1 illustrates a cross-sectional view of an initial stack 100 with which a prior art coil structure may be manufactured. As shown, the stack 100 includes a first layer 102 including $Al_2O_3$ or some other substrate material. Deposited on the first layer 102 is a second layer 104 including Cr or the like. A third layer 106 is deposited on the second layer 104. The third layer 106 is constructed from a conductive material such as Cu or the like.

On the third layer 106 is a fourth layer 108 including masked photoresist that defines a plurality of channels 110. Such channels 110, in turn, define a coil structure. Deposited in the channels 110 is a conductive material 111 such as Cu or the like.

FIG. 2 illustrates another cross-sectional view of the stack 100 of FIG. 1 after various processes. In particular, a protective layer may be positioned on the conductive material in the channels 110 of FIG. 1 so that the fourth layer 108 may be removed using a wet or plasma etch process while portions of the third layer 106 thereunder may be removed utilizing an ion milling process. As a result of the foregoing process, the conductive material 111 takes the form of a coil structure. Various well-known processes may then be exploited to incorporate the coil structure in a magnetic head for use. For example, another layer of photoresist may be applied, and leads may be connected to the conductive material 111 of the coil structure.

A coil structure is thus provided with a certain aspect ratio (B/A). As is well known, high aspect ratios are desirable. Traditionally, however, such aspect ratio is limited due to inherent deficiencies with the ion milling process. For example, ion milling may exhibit difficulties in removing the third layer 106 if the (A) dimension is too small. As a result of such deficiencies, aspect ratios are typically less than six (6).

There is thus a need for a magnetic head coil structure and a method of manufacturing the same with high aspect ratios without the problems associated with the prior art.

DISCLOSURE OF THE INVENTION

A Damascene process is provided for manufacturing a coil structure for a magnetic head. During the manufacturing process, an insulating layer is initially deposited after which a photoresist layer is deposited. A silicon dielectric layer is then deposited on the photoresist layer. After masking the silicon dielectric layer, a plurality of channels are etched in the photoresist layer and the silicon dielectric layer. Then, a conductive seed layer is deposited in the channels. The channels are then ready to be filled with a conductive material and chemically/mechanically polished to define a coil structure.

In one embodiment, the conductive seed layer and the conductive material may include Cu. Furthermore, the grain size of the conductive material may be less than half of the smallest dimension of the channels, and the resistivity of the seed layer may be less than or equal to 8.3 micro-ohm/cm in order to facilitate deposition in the channels.

Another aspect of the present embodiment that facilitates the deposition or/and plating of the conductive material in the channels is a slope of the channels. In one embodiment, the slope of the walls of the channels is greater than one (1) for this purpose. Of course, any other slope may be utilized.

In another embodiment, the silicon dielectric layer may include $SiO_2$. The use of this or any other silicon dielectrics allows etching channels with high aspect ratios of the channels in a range between 7-10, or higher. In such embodiment, the etching may include high density plasma reactive ion etching (RIE).

After the channels are filled with the conductive material, the silicon dielectric layer may be removed by wet or reactive ion plasma etching. As an option, the silicon dielectric layer may be removed by chemical-mechanical polishing (CMP).

Optionally, an adhesion promoter layer may be deposited between the silicon dielectric layer and the masking photoresist layer.

Also provided is another process for manufacturing a coil structure for a magnetic head employing the silicon dielectric layer. During such process, a conductive layer is initially deposited after which a photoresist layer is deposited on the conductive layer. Thereafter, a silicon dielectric layer is deposited on the photoresist layer. After the silicon dielectric layer is masked, a plurality of channels are etched in the photoresist layer and the silicon dielectric layer. Such channels are then filled with a conductive material to define a coil structure.

The present embodiment thus provides a process for manufacturing a small pitch (i.e. 1.0 um) coil structure for a magnetic head utilizing reactive ion etching (RIE). This technique may be utilized in the context of any type of head such as a planar device structure, etc. Moreover, the present embodiment achieves high aspect ratio Cu coil and other P2 structures that are not feasible under a conventional ion milling process.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4C-2 illustrates a coil structure constructed utilizing a large grain size which in turn causes a coil bending defect.

FIG. 4C-3 illustrates a coil structure constructed utilizing a small grain size which avoids the coil bending defect.

FIGS. 4F and 4F-1 illustrate views of the coil structure after chemical-mechanical polishing showing the high aspect ratios thereof.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
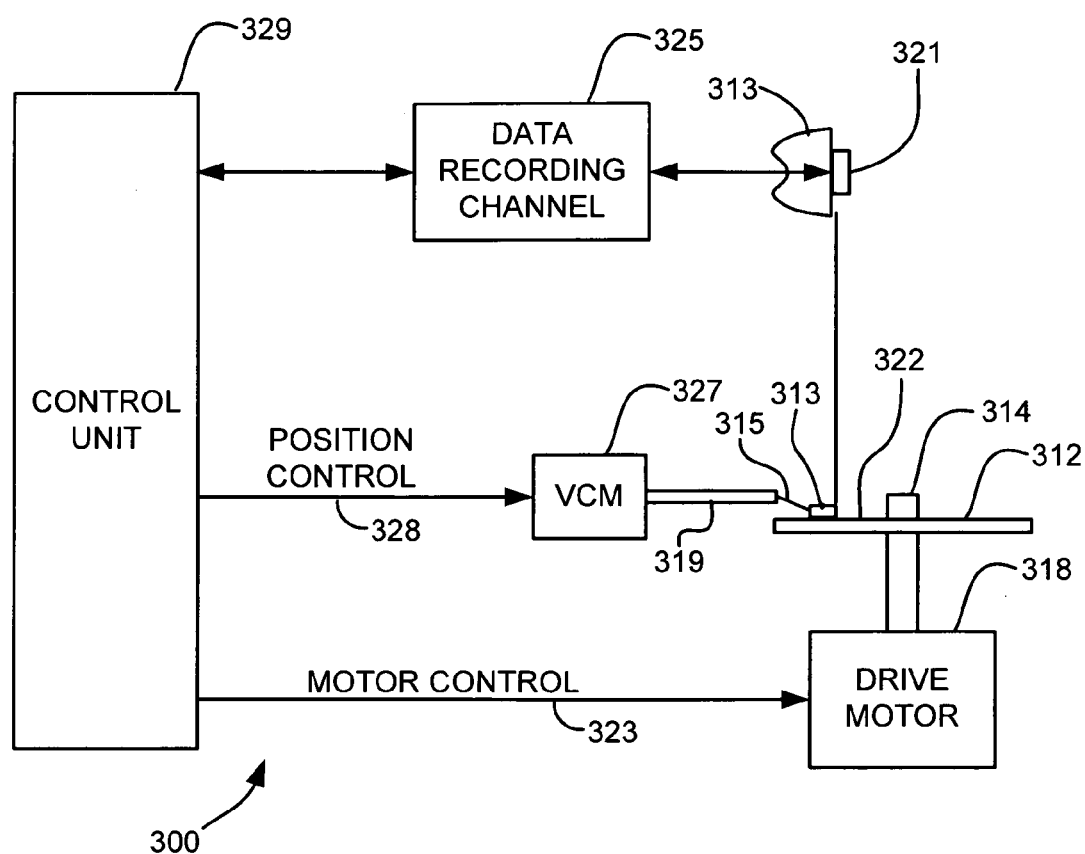
FIG. 3 is a perspective drawing of a magnetic recording disk drive system in accordance with one embodiment of the present invention.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system, and the accompanying illustration of FIG. 3 are for representation purposes only. It should be apparent that disk storage systems may contain a large number of disks and actuators, and each actuator may support a number of sliders.

Figure 4:
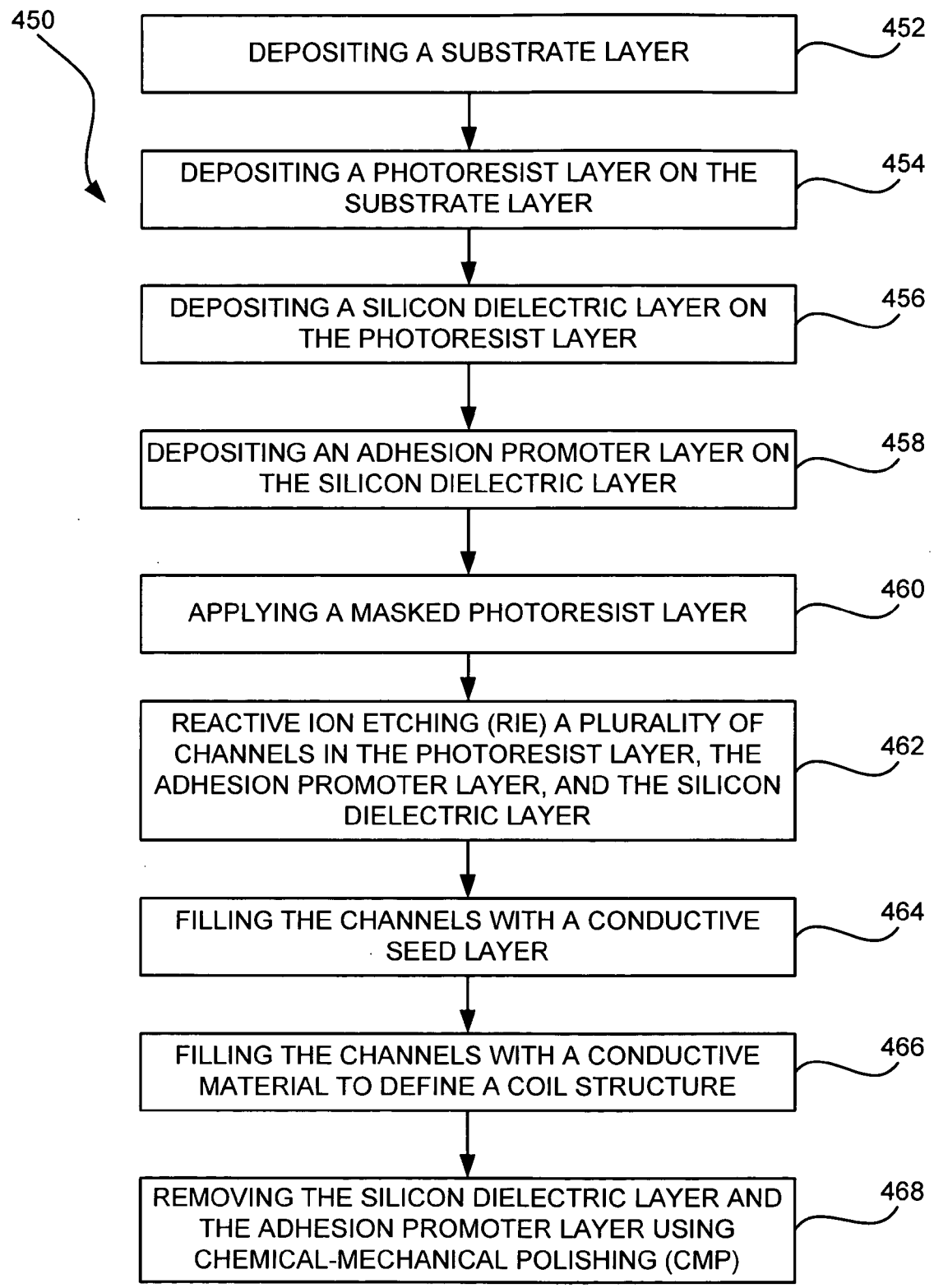
FIG. 4 illustrates a Damascene process by which a coil structure may be manufactured, in accordance with one embodiment.
Figure 5:
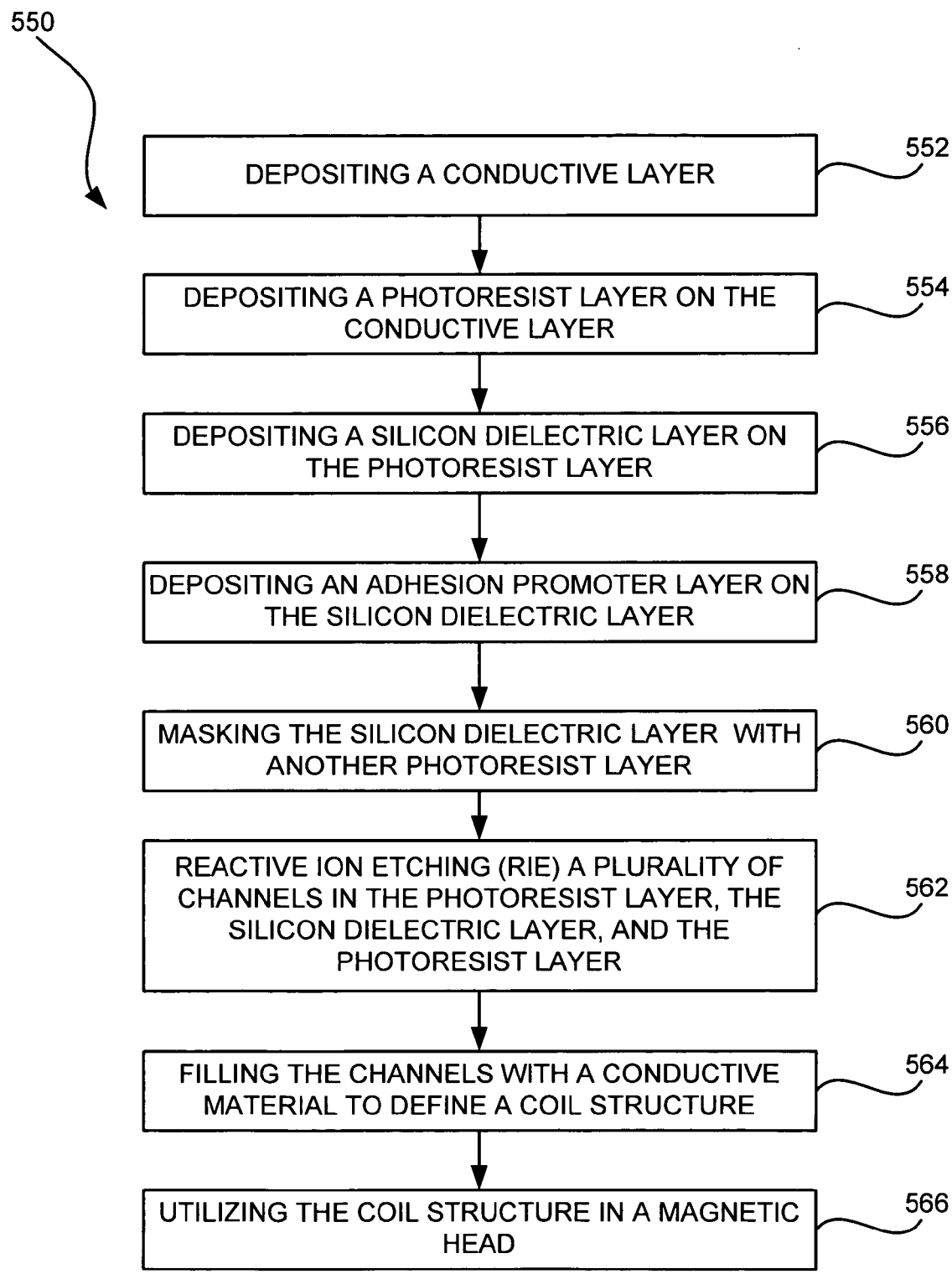
FIG. 5 illustrates a process for manufacturing a coil structure for a magnetic head, in accordance with another embodiment.

FIGS. 4-5 illustrate processes for manufacturing a small pitch (i.e. 1.0 um) coil structure for a magnetic head utilizing high density plasma reactive ion etching (RIE). In one embodiment, the processes of FIGS. 4-5 may be used in the context of the head 321 of FIG. 3. Of course, the head 321 may take any form such as a planar devices, etc.

FIG. 4 illustrates a Damascene process 450 for manufacturing a coil structure for a magnetic head, in accordance with one embodiment. In such embodiment, an insulating layer is initially deposited after which a photoresist layer is deposited. Note operations 452 and 454.

Next, a silicon dielectric layer is deposited on the photoresist layer. See operation 456. Then, an adhesion promoter layer is optionally deposited in operation 458.

A masked second photoresist layer is applied on the adhesion promoter layer in operation 460. As an option, this photoresist layer may be baked at 90-120 degrees Celsius depending on the photo processing condition. Next, a plurality of channels are etched in the adhesion promoter layer, the silicon dielectric layer, and the initial photoresist layer. See operation 462. Preferably, high density plasma reactive ion etching (RIE) is utilized. It should be noted that an aspect ratio of the channels is at least 7 due to the use of the silicon dielectric layer.

Then, in operation 464, a conductive seed layer is deposited in the channels. The channels are then filled with a conductive material to define a coil structure. Note operation 466. The silicon dielectric layer, the adhesion promoter layer and portions of the conductive material are then removed using chemical-mechanical polishing (CMP). See operation 468. The coil structure may then be processed further in a manner that makes the same suitable for use with a magnetic head. FIGS. 4A-4E illustrate the various operations set forth in the process of FIG. 4 in greater detail.

Figure 4A:
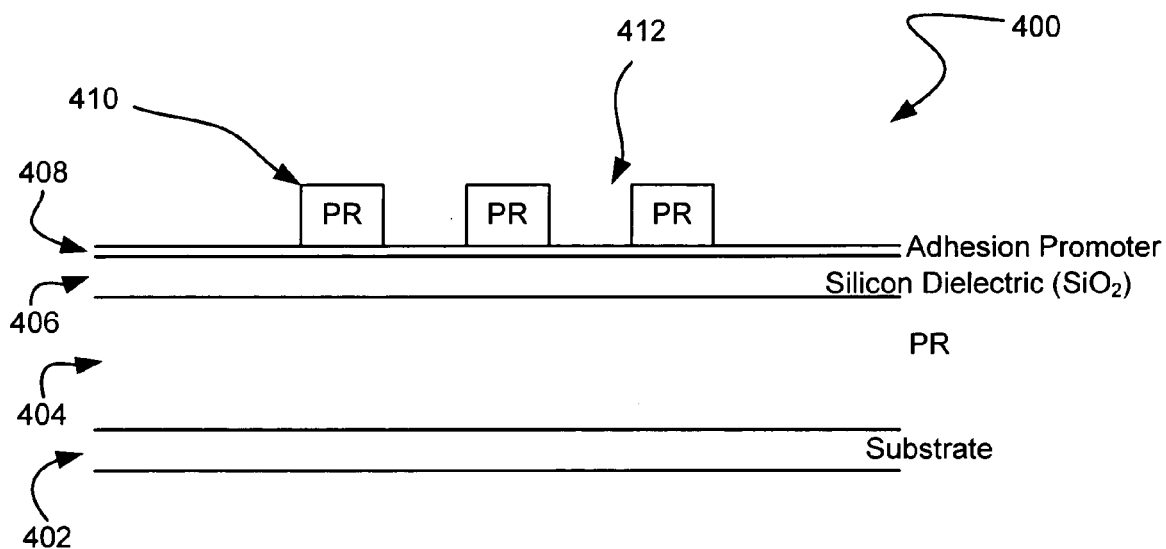
FIGS. 4A-4E illustrate the various operations set forth in the process of FIG. 4 in greater detail.

FIG. 4A illustrates a cross-sectional view of a stack 400 of materials with which the coil structure of the present embodiment is constructed. In the context of the process 450 of FIG. 4, the stack 400 is generated during operations 452-460. As shown, the stack 400 includes an insulating layer 402. In one embodiment, the insulating layer 402 may include a plurality of sublayers including $Al_2O_3$/TiC ($N_{58}$) or any other desired "RIEable" materials.

Deposited on the insulating layer 402 is a first photoresist layer 404. In one embodiment, the first photoresist layer 404 may include AZ 1529 with a thickness of 1.9-4.0 um. In the prior art, performing the standard process of ion milling to remove the seed layer to form isolating Cu lines/structure on just this first photoresist layer 404 often resulted in deficient aspect ratios.

To overcome the deficiencies of the prior art and improve the aspect ratios of a resultant coil structure, a silicon dielectric layer 406 is deposited on the first photoresist layer 404. In one embodiment, the silicon dielectric layer 406 may include $SiO2$, $Si_3N_4$ or any other desired silicon dielectric material that is capable of effecting higher aspect ratios in the manner to be set forth. Further, the thickness of the silicon dielectric layer 406 may be substantially 150 nm, or above or higher than such figure.

As an option, an adhesion promoter layer 408 may be deposited on the silicon dielectric layer 406. In one embodiment, the adhesion promoter layer 408 may include Hexamethyl Disilazane (HMDS) with a thickness of 0.5-5 nm.

Such adhesion promoter layer 408 receives a patterned second photoresist layer 410 thereon which defines a mask. The patterned second photoresist layer 410 defines a plurality of channels 412 which, in turn, will define the resultant coil structure, as will soon become apparent. In one embodiment, the second photoresist layer 410 may include AZ 7905 with a thickness of 0.5 um. Further, the channels may have an opening width of 0.10-0.5 um or smaller.

Figure 4B:
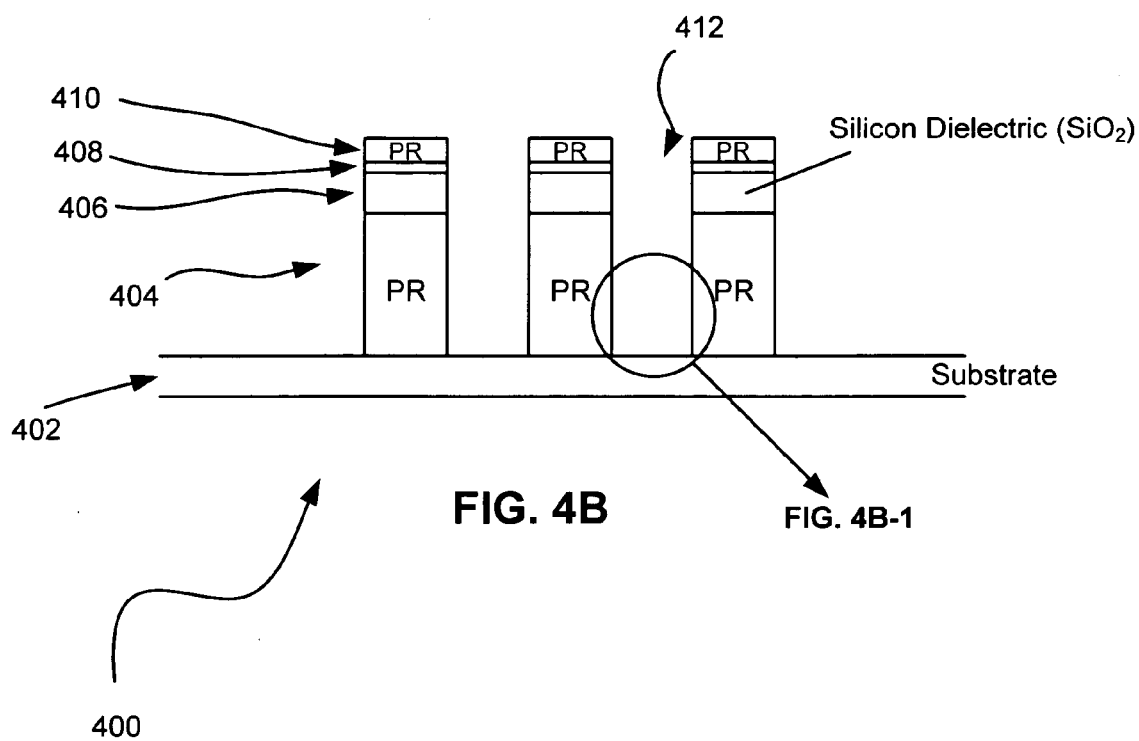
Figures 1, 4B:
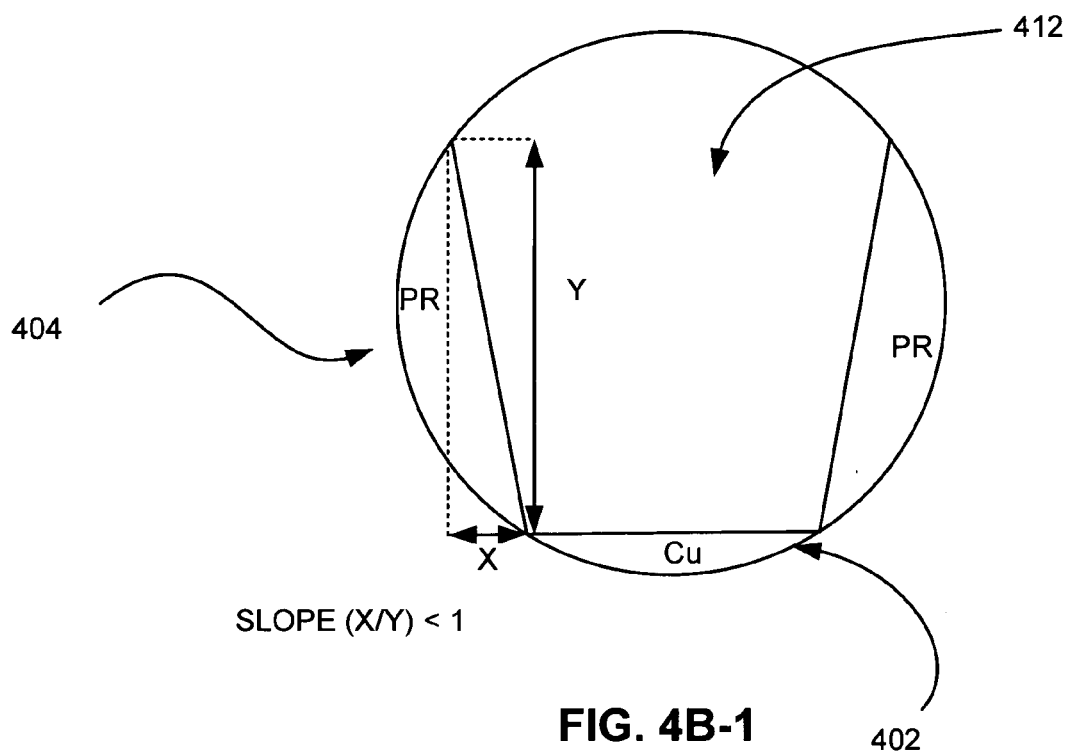

FIG. 4B illustrates another cross-sectional view of the stack 400 after an ion milling process, in accordance with operation 462 of FIG. 4. Preferably, reactive ion milling (RIE) is employed. As shown, the reactive ion milling results in an etching of the channels 412 down to the insulating layer 402. Tables 1 and 2 illustrate exemplary details associated with a first and second step of a 0.8 um pitch coil RIE process that may be utilized in the context of the present embodiment, respectively.

TABLE 1

SiO2 dielectric etching process

| Hard Mask | $SiO_2$ 150 nm |
|---|---|
| Gas | 32 sccm $CHF_3$/8 sccm $CF_4$ |
| Coil Power | 800 W |
| Platen Power | 100 W |
| Voltage Bias | 110 V |
| Temperature | 0 C. |
| Wall Profile | Straight |

TABLE 2

Base resist etching process

| Base Layer | 1.7-4.5 um |
|---|---|
| Gas | 32 sccm $CO_2$ |
| Coil Power | 300 W |
| Platen Power | 110-275 W |
| Voltage Bias | 350-640 V |
| Temperature | −20 C. |
| Wall Profile | Slightly Bowing |
| $Al_2O_3$ | Sputter Minimal |

Tables 3 and 4 illustrate exemplary details associated with a first and second step of a P2 RIE image transfer process that may be utilized in the context of the present embodiment to fabricate a P2 NiFe pole tip structure with a Damascene process. In this case, the Cu fill and plating is substituted by NiFe seed and magnetic bi- and tri-nary metals (NiFe, CoFe, NiCoFe, etc.), respectively.

TABLE 3

Silicon dielectrics Dielectric Hard mask etch process

| Hard Mask | 1500-5000 A $SiO_2$ |
|---|---|
| Gas | 32 sccm $CHF_3$/8 sccm $CF_4$ |
| Coil Power | 800 W |
| Platen Power | 100 W |
| Voltage Bias | 130 V |
| Temperature | 0 C. |
| Wall Profile | Straight |

TABLE 4

Base resist etch process

| Base Layer | 2.2-5 um |
|---|---|
| Gas | 30 sccm $CO_2$ |
| Coil Power | 300 W |
| Platen Power | 150 W |
| Voltage Bias | 310 V |
| Temperature | −20 C. |
| Wall Profile | Straight |
| $Al_2O_3$ | Sputter Minimal |

Figure 1:
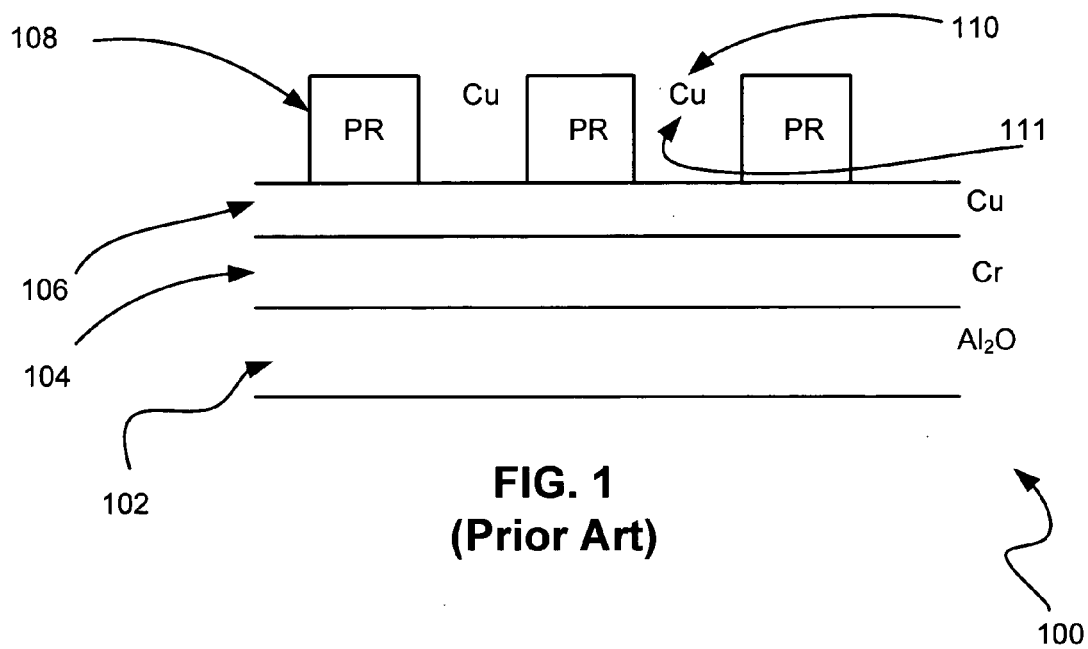
FIGS. 1-2 illustrate a method of manufacturing a coil structure associated with a magnetic head, in accordance with the prior art.

In one embodiment, the reactive ion milling defines side walls of the channels 412 such that the slope thereof is greater than one (1) to achieve an angle for reasons that will soon become apparent. FIG. 4B-1 is a close-up view of the encircled area of FIG. 4B showing the slope of the side walls of the channels 412. As shown, each of the side walls taper inwardly from a top to a bottom of the channels 412.

Figure 4C:
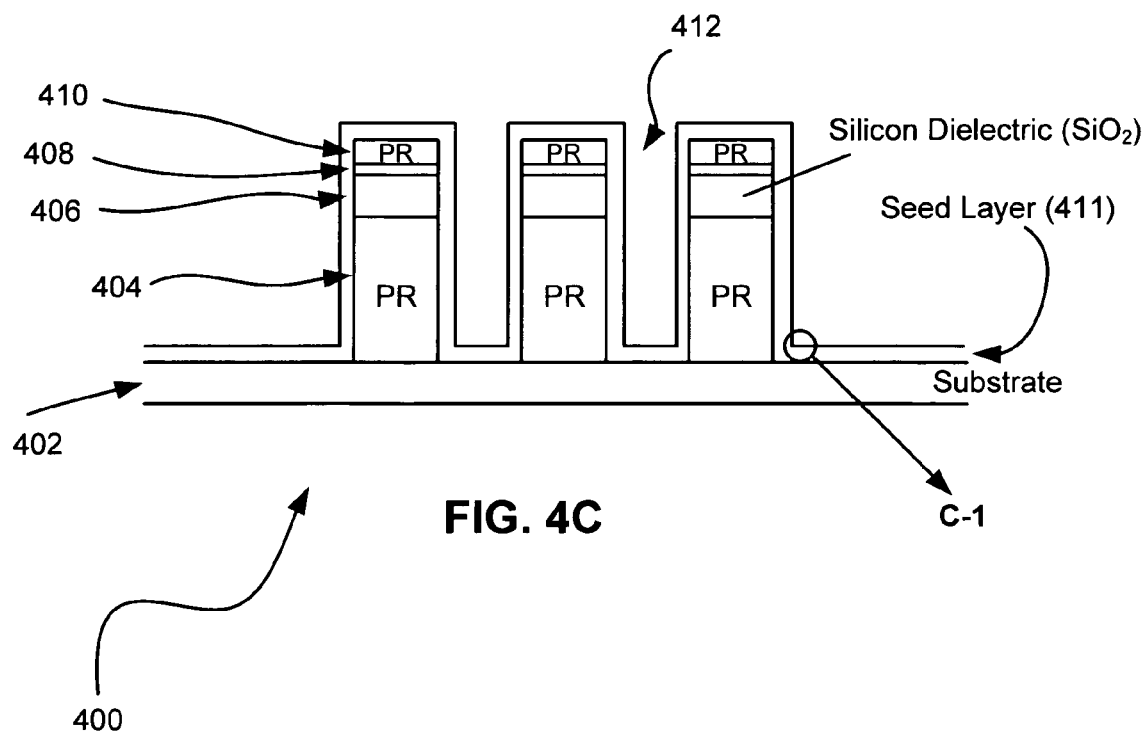
Figures 1, 4C:
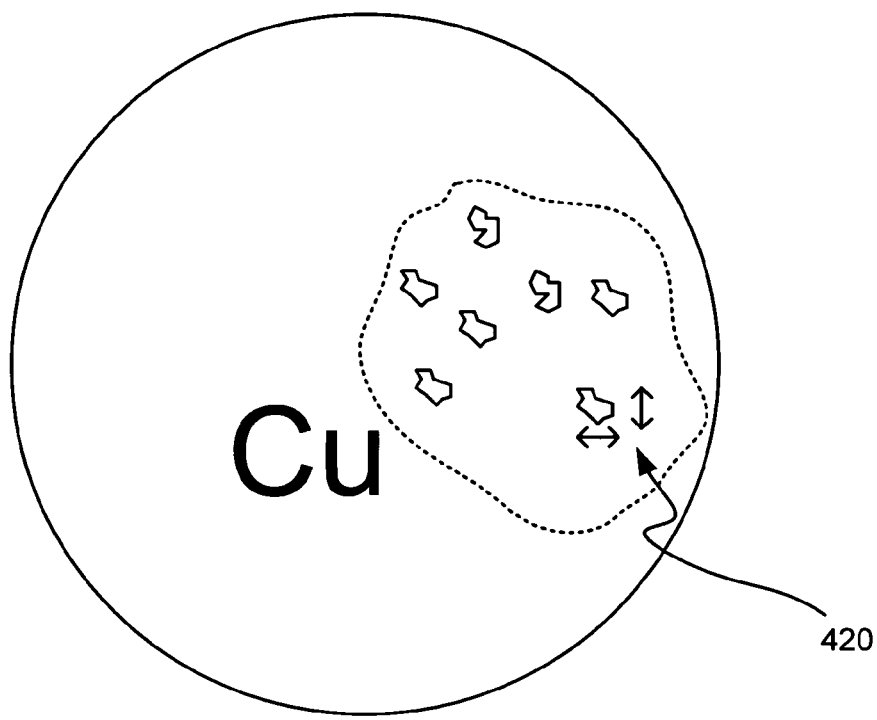

FIG. 4C shows the manner in which the channels 412 are filled with a seed layer 411, in accordance with operation 464 of FIG. 4. In one embodiment, the conductive seed layer 411 may include Cu, $TaN_x$, Ta, or any other desired material. As an option, bright Cu may be used for reasons that will soon become apparent. By depositing the conductive seed layer after etching, the Damascene process 450 avoids the need to remove a seed layer as is required in the prior art. See again FIGS. 1-2.

As an option, the resistivity of the seed layer 411 may be specified to be less than or equal to 8.3 micro-ohm/cm in order to facilitate the deposition of the seed layer 411 in the channels 412. Further, the average grain size of the conductive layer 414 may be specified to be less than or equal to half of the smallest dimension of the channels. FIG. 4C-1 is a close-up view of the grain size of the seed layer 411, as shown in the encircled area of FIG. 4C.

In use, the smaller grain size 420 of the conductive layer 414 material may be more easily deposited down the sloped side walls of the channels 412. By this design, the sloped side walls of the channels 412, the smaller grain size of the conductive layer 414, and the low resistivity of the seed layer 411 (</=8.3 micro-ohm/cm) work together to provide a more complete fill of the channels 412.

Figure 2:
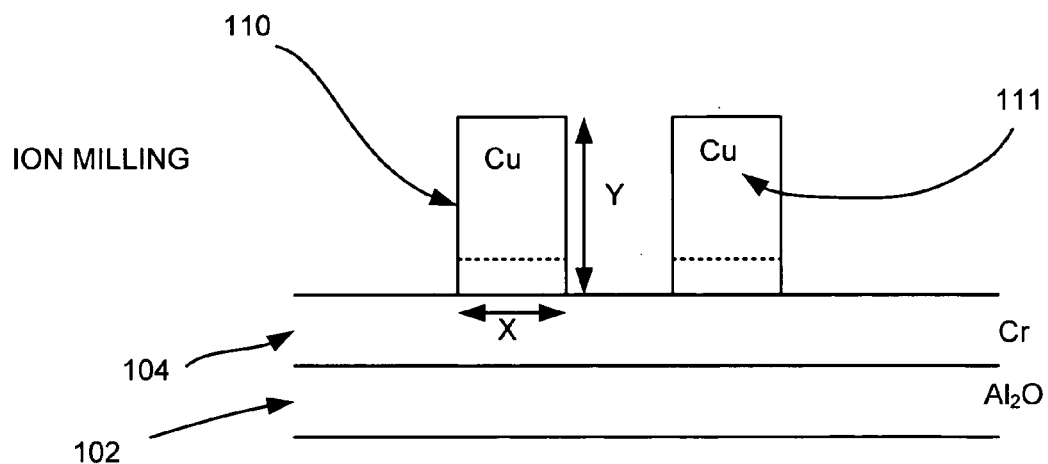

It should be noted that the seed layer 411 is deposited over an entirety of the stack 400. Note FIG. 4C. As will become apparent, this is important for affording a coil structure with optimal planarity. FIG. 4C-2 illustrates a coil structure 422 constructed utilizing a large grain size which in turn causes a coil bending defect 423. FIG. 4C-3 illustrates a coil structure 422 constructed utilizing a small grain size which avoids the coil bending defect.

Figure 4D:
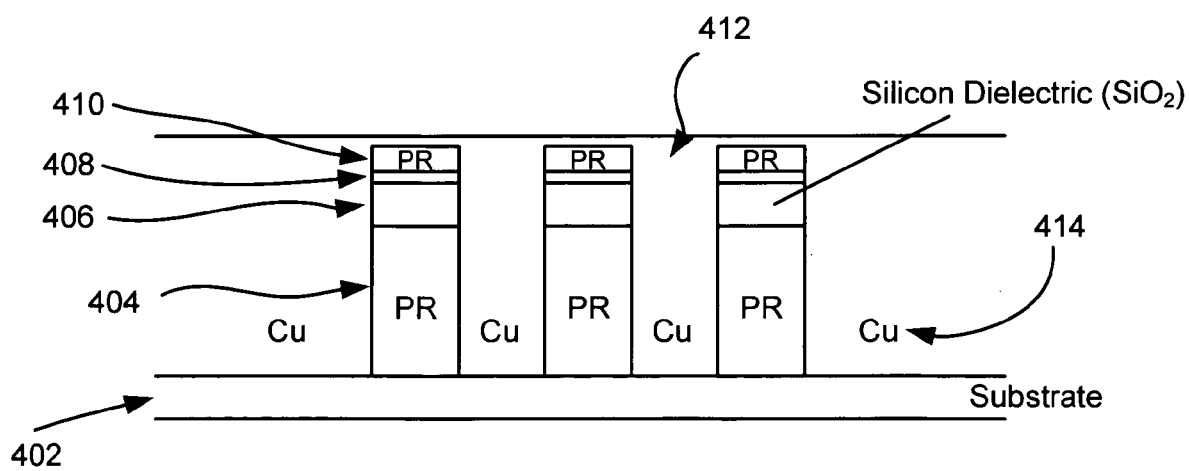
Figures 2, 4C:
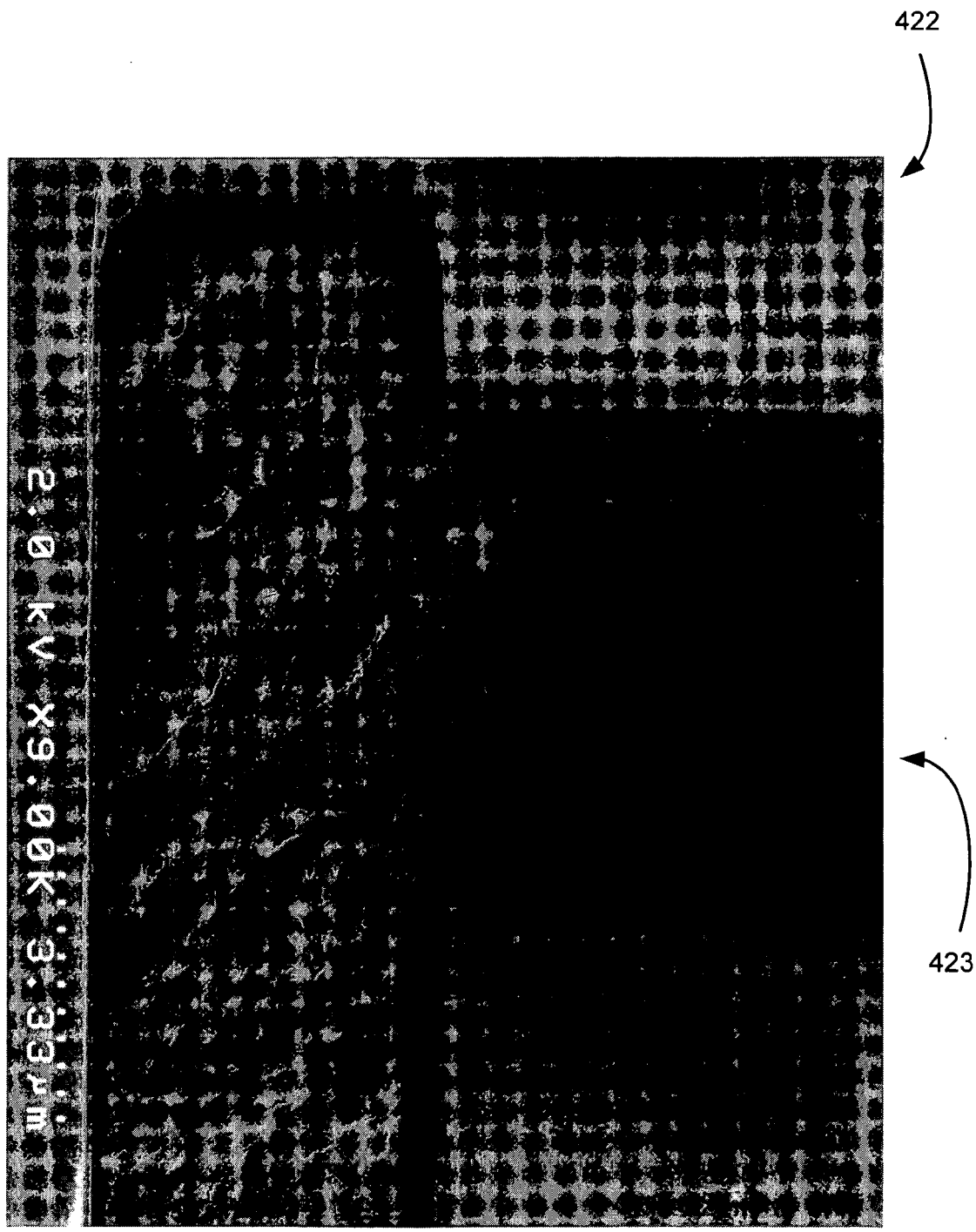
Figures 3, 4C:
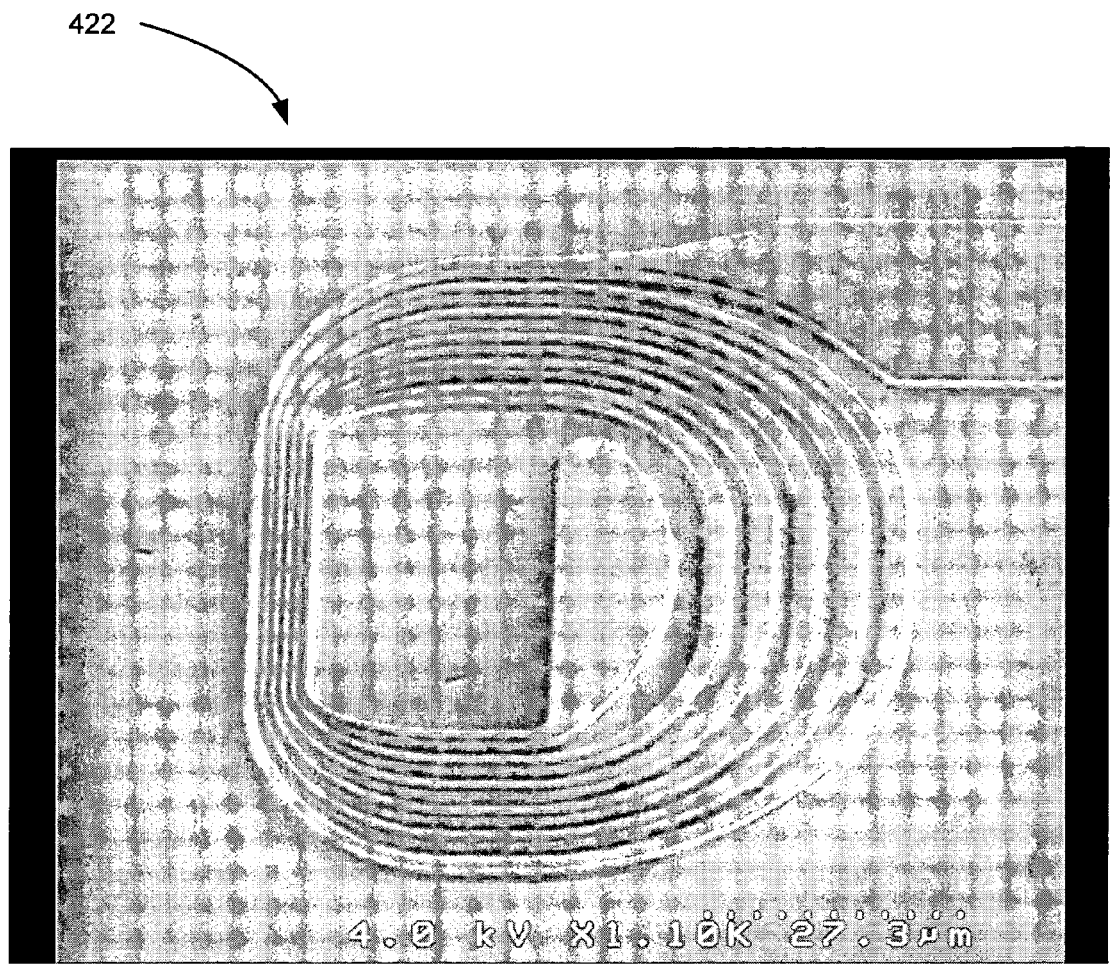

FIG. 4D shows the manner in which the channels 412 are filled with a conductive material 414. Note operation 466 of FIG. 4. Ideally, both the conductive material 414 and seed layer 411 have the grain size mentioned hereinabove.

Figure 4E:
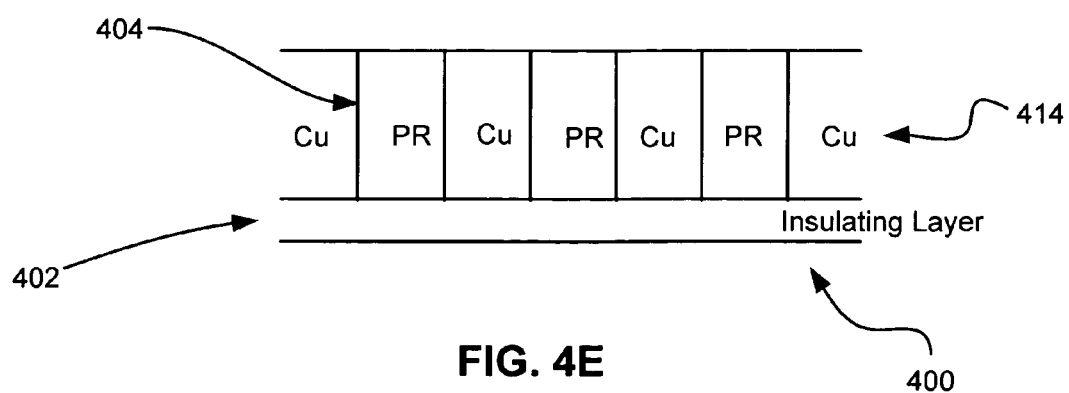

FIG. 4E illustrates the manner in which a plurality of the layers of the stack 400 are removed by chemical-mechanical polishing, in accordance with operation 468 of FIG. 4. In particular, the photoresist layer 410, adhesion promoter layer 408, and silicon dielectric layer 406 are removed. As shown, the polishing results in a coil structure 422 with a planar surface.

Figure 4F:
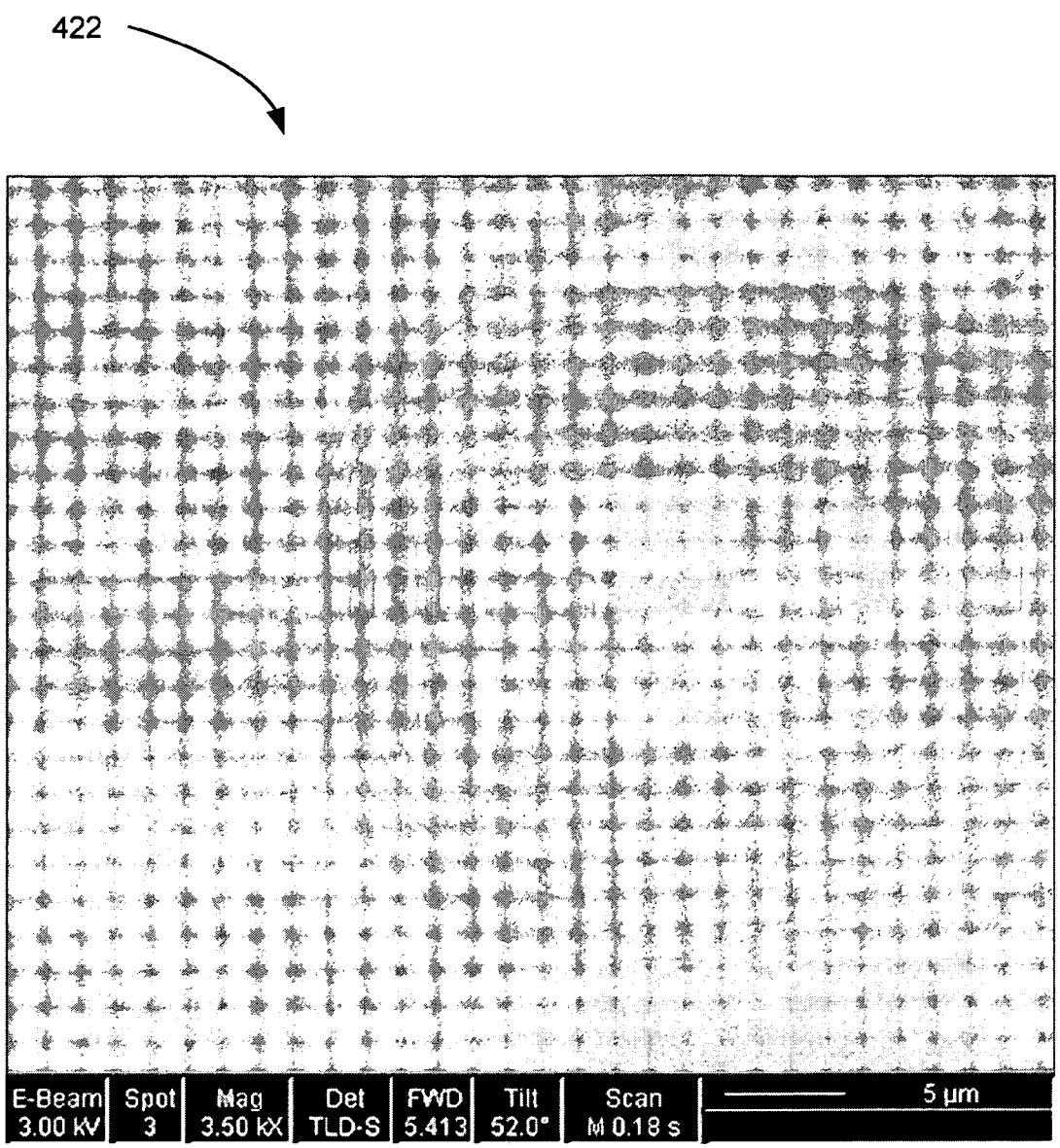
Figures 1, 4F:
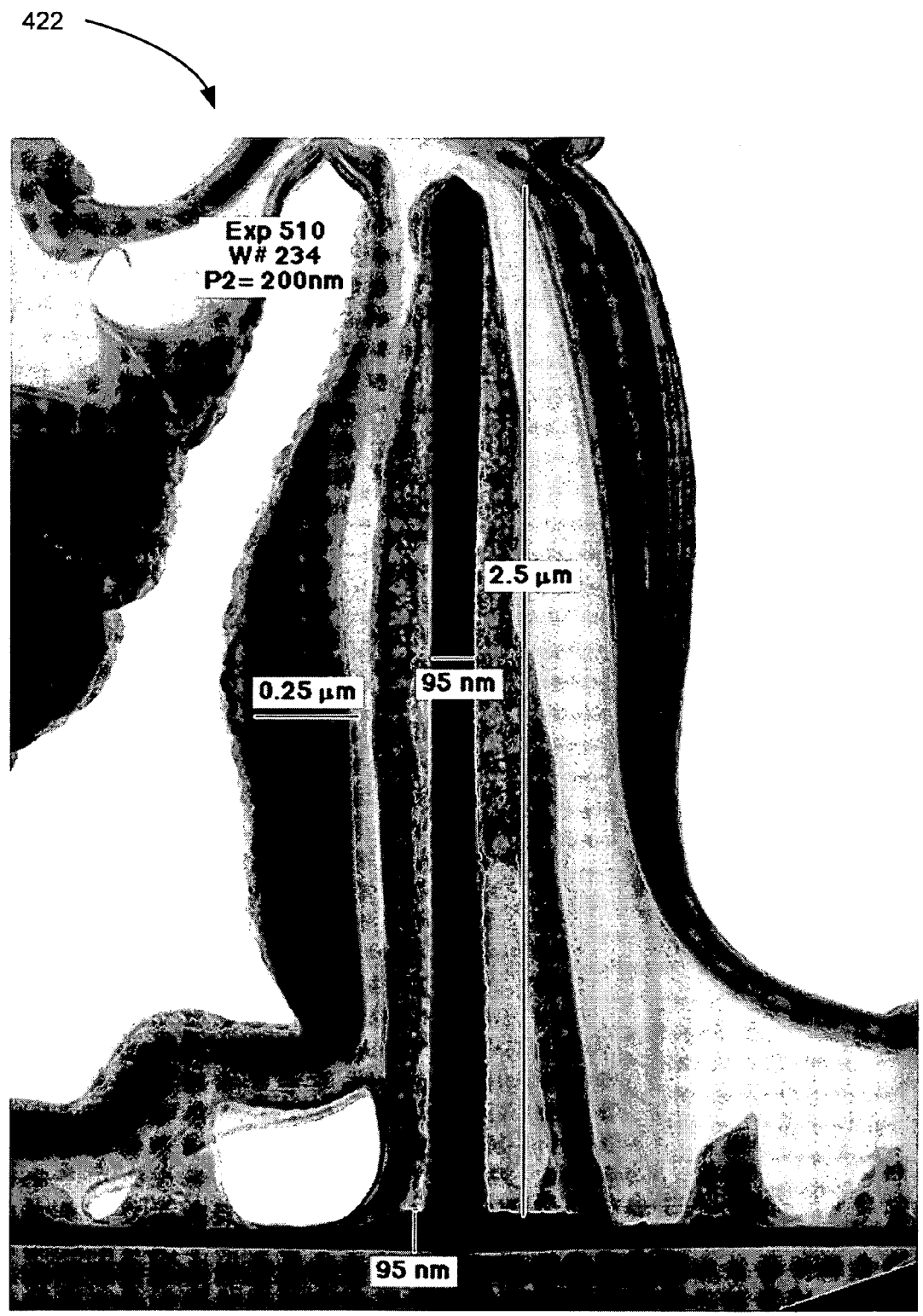

FIG. 4F illustrates another view of the coil structure 422 after processing in accordance with the Damascene process of Tables 1 and 2. FIG. 4F-1 illustrates another view of the coil structure 422 after processing in accordance with the process of Tables 3 and 4, showing the high aspect ratio thereof.

Figure 4G:
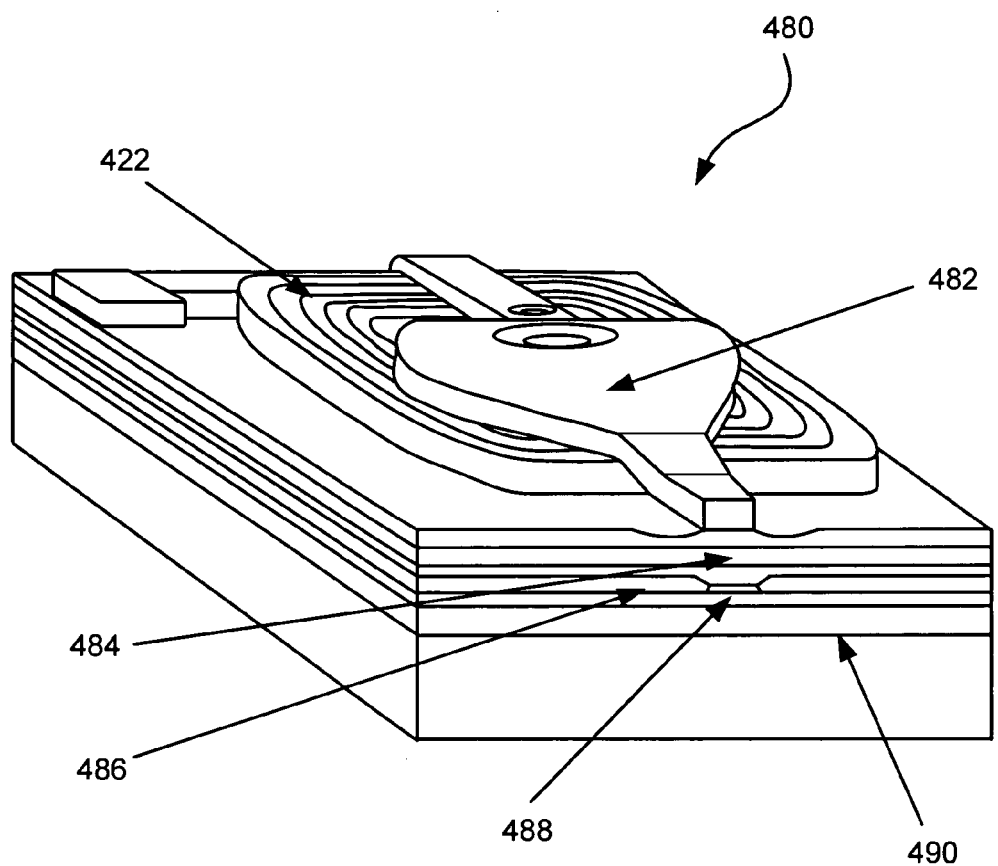
FIG. 4G illustrates the coil structure in the context of an exemplary head, in accordance with one embodiment.

FIG. 4G illustrates the coil structure 422 in the context of a head 480, in accordance with one embodiment. It should be noted that the various remaining components of the head 480 may vary per the desires of the user. As shown, the head 480 includes an inductive write head P2 layer 482 positioned above the coil structure 422. Positioned below the coil structure 422 is an inductive write head P1 layer & top shield 484. GMR contacts and a hard bias layer 486 are situated below layer 484 with a GMR sensor 488 situated therein. Further provided is a bottom shield 490.

FIG. 5 illustrates a process 550 by which a coil structure may be manufactured, in accordance with another embodiment. It should be noted that the present embodiment is similar to the conventional process shown in FIGS. 1-2 with the exception of the unique use of the silicon dielectric layer. Of course, any of the techniques discussed hereinabove may optionally be applied in the context of the present embodiment per the desires of the user.

As shown, a conductive layer is deposited in operation 552. In one embodiment, the conductive layer may include 7 nm $Si_3N_4$/40 nm Cu/3 nm Cr/$Al_2O_3$/TiC ($N_{58}$) substrate. The presence of the $Si_3N_4$ layer reduces the oxidation of the Cu layer during processing, and can be removed prior to conductive layer deposition. Thereafter, a photoresist layer is deposited on the conductive layer in operation 554.

In an alternate embodiment, the present process 550 may be utilized to fabricate a P2 magnetic pole, sub-half micron pole structure using reactive ion etching image transfer in a manner that will soon become apparent. In such embodiment, the Cu material may be substituted with magnetic materials (i.e. NiFe, CoFe, CoNiFe, etc.), while the other processing steps remain substantially the same.

Next, in operation 556, a silicon dielectric layer is deposited on the photoresist layer. An adhesion promoter layer is then optionally deposited in operation 558 after which the deposited structure is masked with another photoresist layer in operation 560. Reactive ion etching (RIE) is then used to define a plurality of channels in the photoresist layer, adhesion promoter layer and the silicon dielectric layer. See operation 562.

Next, in operation 564, the channels are filled with a conductive material. Thereafter, reactive ion etching and milling processes similar to that set forth in the context of FIGS. 1-2 may be carried out in order to remove the photoresist layers, adhesion promoter layer, the silicon dielectric layer, and portions of the conductive layer between the conductive material-filled channels to further define the coil structure.

The coil structure may then be processed in a manner that makes the same suitable for use with a magnetic head in operation 566. For example, various well-known processes may be exploited to incorporate the coil structure in a magnetic head for use. In particular, another layer of photoresist may be applied, and leads may be connected to the conductive material of the coil structure.

Two processes are thus disclosed for manufacturing a small pitch (i.e. 1.0 um or less) coil structure for a magnetic head utilizing reactive ion etching (RIE). These processes and accompanying techniques may be utilized to achieve high aspect ratios in the range of 7-10, or higher.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A process for manufacturing at least one of a pole structure and a coil structure for a magnetic head, comprising:
    depositing a conductive layer;
    depositing a photoresist layer on the conductive layer;
    depositing a silicon dielectric layer on the photoresist layer;
    masking the silicon dielectric layer;
    etching at least one channel in the photoresist layer and the silicon dielectric layer; and
    filling the at least one channel with a conductive material to define at least one of a coil structure, and a pole tip structure;
    wherein an aspect ratio of the at least one channel is at least about 7;
    wherein a grain size of the conductive material is less than half of a smallest dimension of the at least one channel.

2. The process as recited in claim 1, wherein the conductive layer includes Cu if the coil structure is being formed.

3. The process as recited in claim 1, wherein the conductive material includes Cu.

4. The process as recited in claim 1, wherein the silicon dielectric layer includes SiO2.

5. The process as recited in claim 1, wherein the etching includes reactive ion etching (RIE).

6. The process as recited in claim 1, wherein the masking includes depositing another photoresist layer.

7. The process as recited in claim 1, and further comprising removing the silicon dielectric layer.

8. The process as recited in claim 1, and further comprising depositing an adhesion promoter layer between the silicon dielectric layer and the photoresist layer.

9. The process as recited in claim 1, wherein the conductive layer includes a magnetic material.

10. The process as recited in claim 1, wherein the conductive material includes a magnetic material.

11. The process as recited in claim 9, wherein the magnetic material is selected from the group consisting of NiFe, CoFe, and CoNiFe.

12. The process as recited in claim 1, wherein the coil structure includes a P2 pole tip structure.

13. The process as recited in claim 1, wherein the conductive layer includes an Si-containing material.

14. A process for manufacturing at least one of a pole structure and coil structure for a magnetic head, comprising:
    depositing a conductive layer;
    depositing a photoresist layer on the conductive layer;
    depositing a silicon dielectric layer on the photoresist layer;
    masking the silicon dielectric layer;
    etching at least one channel in the photoresist layer and the silicon dielectric layer; and
    filling the at least one channel with a conductive material to define at least one of a coil structure and a pole tip structure,
    wherein an aspect ratio of the at least one channel is at least 7.

15. The process as recited in claim 14, wherein a grain size of the conductive material is less than half of a smallest dimension of the at least one channel.

16. The process as recited in claim 15, wherein the grain size facilitates the depositing of the conductive material in the at least one channel.

17. A process for manufacturing at least one of a pole tip and a coil structure for a magnetic head, comprising:
   depositing a conductive layer;
   depositing a photoresist layer on the conductive layer;
   depositing a silicon dielectric layer on the photoresist layer;
   masking the silicon dielectric layer;
   etching at least one channel in the photoresist layer and the silicon dielectric layer; and
   filling the at least one channel with a conductive material to define at least one of the pole tip and the coil structure,
   wherein a grain size of the conductive material is less than half of a smallest dimension of the at least one channel.

18. The process as recited in claim 17, wherein the coil structure includes a P2 pole tip structure.

* * * * *